Feb. 9, 1960
J. S. McCLURE
2,924,722
VACUUM CONTROL DEVICE FOR GENERATORS
Filed June 2, 1958
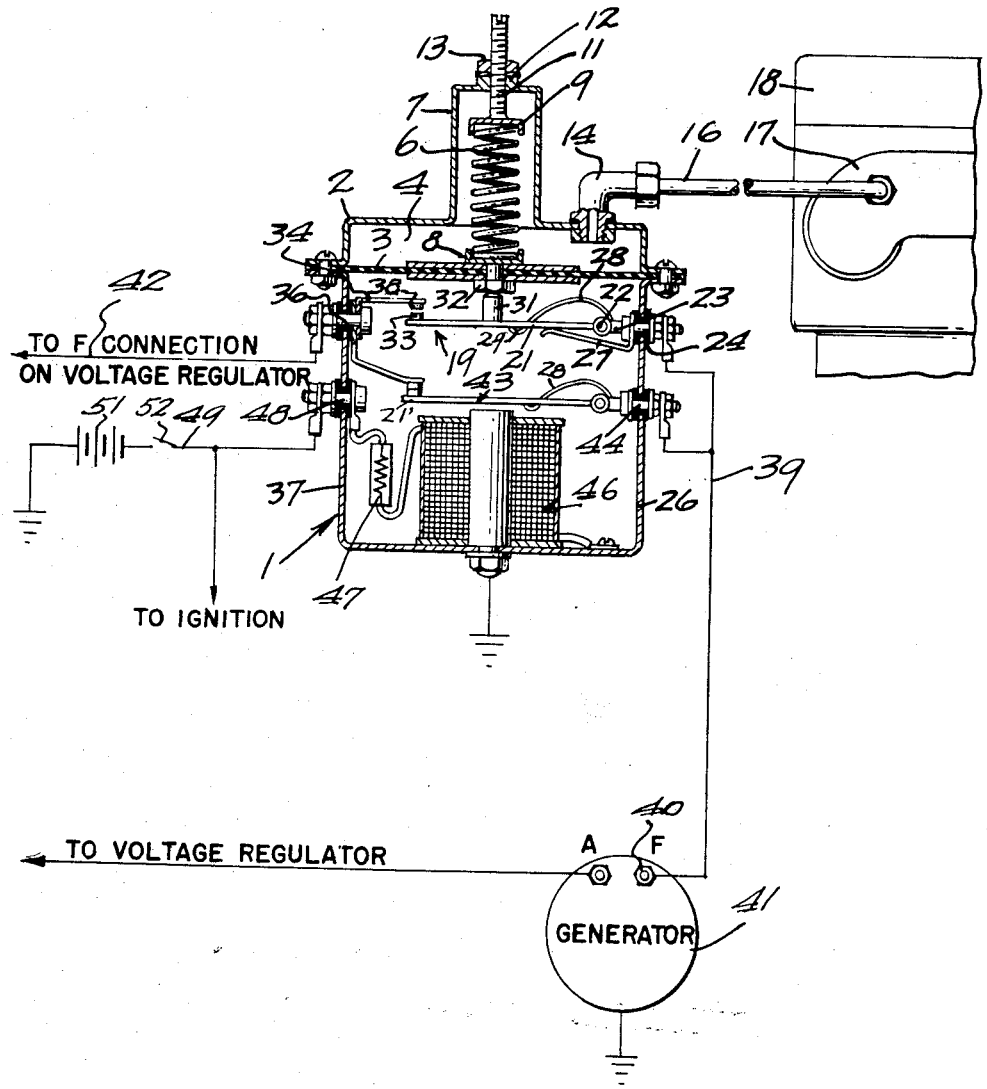
INVENTOR.
JAMES S. McCLURE
BY George B. White
ATTORNEY United States Patent Office 2,924,722
Patented Feb. 9, 1960

2,924,722

VACUUM CONTROL DEVICE FOR GENERATORS

James S. McClure, San Francisco, Calif., assignor of one-half to Roy T. Harding, San Francisco, Calif.

Application June 2, 1958, Serial No. 739,056

8 Claims. (Cl. 290—40)

This invention relates to a generator control device and particularly a vacuum actuated control device to cut out the generator load on an engine when the engine is pulling predetermined loads, heavier than normal.

When an engine in addition to its propelling load also drives a generator, as, for instance, the engines of motor vehicles, more power can be utilized for propulsion when the generator load on the engine is eliminated. In motor vehicles with comparatively low horse-power engines the elimination of the generator load on the engine at times when the engine is pulling heavy loads is of substantial operative difference. For instance, such a motor would have to be shifted into low gear or second gear to climb a certain incline with the generator load on the engine, but it could climb the same incline in third gear if the generator load is cut off and conversely less downhill braking would be required. A characteristic of an engine which responds to variation of load on the engine is the vacuum created at its intake manifold. Namely, as the engine is accelerated to pull a heavy load, the vacuum in the manifold is decreased and when the engine is decelerated to normal pull the vacuum is correspondingly increased to normal.

The primary object of the invention is to provide a generator load control device responsive to a characteristic of the engine so as to cut out the generator load at a predetermined increased load on the engine and to cut-in the generator load when the load on the engine is decreased to normal.

Particularly it is an object of the invention to provide a vacuum responsive generator load control to cut-out the generator load when the vacuum in the engine manifold is decreased by reason of the increased propelling load on the engine of a motor vehicle and to cut in the generator load at a predetermined increase in vacuum, i.e. when the engine is running under a very light propelling load or is decelerating.

Another object of this invention is to provide a vacuum actuated cut-out device to cut-out the generator load on an engine upon a predetermined increase of propelling load, and to provide an auxiliary device responsive to the battery charged by said generator to cut the generator load in irrespective of the load on the engine whenever the battery is discharged below a predetermined strength.

Another object of this invention is to afford more rapid deceleration of an internal combustion engine by reason of the braking effect of the resumed generator load, which latter upon resumption is temporarily charging at the maximum rate for the particular charging circuit, and thus also improves the efficiency of the engine when the engine is utilized for braking the vehicle; the braking effect of the resumption of generator load and the resultant more rapid decrease of engine speed also facilitates gear shifting.

I am aware that some changes may be made in the general arrangements and combinations of the several devices and parts, as well as in the details of the construction thereof without departing from the scope of the present invention as set forth in the following specification, and as defined in the following claims, hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

The figure shows a sectional view of my control device with a fragmental view of the engine manifold and with a wiring diagram of connections to the generator and to the battery.

In the herein illustrative embodiment of my invention, I provide a casing 1 on which is suitably secured a hollow lid 2 so as to fasten a diaphragm 3 across the top of the casing 1 and form a vacuum chamber 4 above the diaphragm 3.

A coil spring 6 in a neck 7 of the lid 2 bears at its lower end against a cup 8 on the top of the diaphragm 3 and at its upper end against a cup 9 on a tension adjusting screw 11 threaded into a boss 12 in the top of the neck 7. A suitable locknut 13 locks the adjusting screw 11 in adjusted position so as to determine the tension for holding the diaphragm 3 in its initial position.

A suitable nipple 14 on the lid 2 communicates the chamber 4 through a suitable conduit 16 with the intake manifold 17 of an internal combustion engine 18.

Immediately below the diaphragm 3 is a suitable circuit breaker or switch 19. An arm 21 of the circuit breaker 19 is pivoted on a pivot 22 on a terminal post 23 secured in an insulator bushing 24 in a wall 26 of the casing 1. A limit arm 27 extends from the post 23 and bears against the underside of the circuit breaker arm 21. A bow spring 28 extends from the post 23 above the arm 21 and has its end 29 curved upwardly and against the underside of the arm 21 to urge the arm 21 upwardly toward the diaphragm 3. A pin 31 extends upwardly from the arm 21 and abuts an abutment 32 on the underside of the diaphragm 3. On the free end of the arm 21 is a contact 33. A contact finger 34 is mounted on a terminal post 36 in the opposite wall 37 of the casing 1, as shown, so that the contact 38 on the finger 34 is above the lower contact 33 and is engaged by the latter when the diaphragm 3 is lifted by suction in the vacuum chamber 4 upwardly for closing the generator circuit as hereinafter described.

The terminal post 23 is suitably connected by a line 39 to the F or field terminal 40 of the generator 41. The other terminal post 36 is connected by a line 42 to F or field connection on the usual voltage regulator which controls the generator. Thus the circuit breaker or switch 19 is connected in series with the field terminal 40 of the generator 41 and breaks the generator's field circuit whenever the circuit breaker or switch 19 is being held open by the diaphragm 3 in its initial position, as shown. As the engine 18 operates at normal load the vacuum in the manifold creates sufficient suction in the chamber 4 to overcome the tension of the coil spring 6 and raise the diaphragm 3 so as to permit the switch arm 21 to be raised by the bow spring 28 and to close the generator field circuit through the contacts 33 and 38, and thus impose the generator load on the engine. When the engine pulls a heavy load, the vacuum in the manifold 17 is correspondingly decreased and when the suction created by said vacuum decreases below a degree predetermined by the adjusted tension of the coil spring 6, then the coil spring 6 urges the diaphragm 3 to its said initial or decreased vacuum position, as shown, so as to push the switch arm 21 downward and break the generator field circuit between the contacts 33 and 38 and thus cut out the generator load on the engine 18.

Under ordinary circumstances, a vehicle engine is subjected to heavy strain or load only for comparatively brief periods. A vehicle is driven under normal load most of the time, so that the disconnecting of the generator for a limited period will not cause material depletion of the battery charge. However, if the generator is cut out for an unduly long interval, or if the battery charge for any reason deteriorates below a critical voltage, then the generator circuit is closed by an auxiliary switch 43 automatically irrespective of the position of the vacuum controlled circuit breaker or switch 19.

This auxiliary switch 43, in the herein illustrative embodiment, is identical with the first switch 19 and is shunted in series between generator field lines 39 and 42 respectively through terminal posts 44 and 36, and in parallel with the vacuum actuated circuit breaker 19. The bow spring 28 of this auxiliary switch 43 normally holds the arm 21 in switch closing position, as shown. An electro-magnet 46 is connected through a suitable resistance 47, post 48 and line 49 to one of the terminals of battery 51. The ignition switch 52 is connected in series in line 49. The other terminal of the battery 51 and the other terminal of the solenoid of the electro-magnet 46 are suitably connected by grounding. The resistance 47 and the electro-magnet 46 are so designed or set that a predetermined voltage pressure of the battery will sufficiently energize the electro-magnet 46 to hold the arm 21' of the auxiliary switch 43 in switch opening position, but when the battery charge deteriorates below said predetermined critical degree, then the electro-magnet 46 is partially de-energized so as to release said arm 21 of the auxiliary switch 43 and permit the closing of said auxiliary switch, thereby closing the circuit through the lines 39 and 42 of the generator field circuit, irrespective of the position of the vacuum controlled switch 19.

In operation, as the ignition circuit is closed to start the engine, the electro-magnet 46 is energized and the auxiliary switch 43 is kept open. When the engine is started, the normal operating vacuum in the engine manifold 17 creates suction through conduit 16 and nipple 14 in the chamber 4 above the diaphragm 3 and lifts the diaphragm 3 so as to permit the closing of the main switch 19 thus operating the generator 41 in the usual manner. When the vehicle climbs an incline or for some other reason heavy load is imposed on the engine 18, the vacuum in the manifold 17 decreases and when this decrease is such that it is incapable of overcoming the adjusted tension of the coil spring 6, then the coil spring 6 pushes the diaphragm 3 downwardly to the initial position shown in the drawing and opens the main switch 19 thereby breaking the field circuit of the generator 41 and thus relieving the engine 18 of the generator charging load. This action correspondingly increases the power of the engine applied to pulling or propelling the vehicle by relieving the engine of the generator charging load. When the propelling load on the engine is again relieved to a predetermined degree, the vacuum in the manifold 17 is again thereby increased and the resultant suction in the chamber 4 again lifts the diaphragm 3 closing the field circuit of the generator 41 so that the generator is again operated by the engine 18. If for some reason the battery charge decreases below a critical predetermined voltage the auxiliary switch 37 is permitted to close the field circuit of the generator, as heretofore described. For instance, in case of 6 volt battery, the critical voltage at which the auxiliary switch 37 is closed, would be about 5.8 volts. Thus the danger of discharging the battery is avoided under all circumstances, yet the cutting out of the generator load from the engine can be accomplished promptly, when permissible by the battery condition, so as to increase the output of the engine power for pulling when needed.

It was found that when the generator load on the engine is resumed, after its temporary cutoff, the generator resumes charging at its maximum charging rate until the battery is recharged to its normal voltage. This full generator load at this time improves the use of the engine for braking the vehicle and also accelerates the decrease of engine speed and correspondingly facilitates gear shifting.

I claim:

1. In a device for controlling the generator load on the engine of a vehicle, a circuit closing device connected to the electric circuit of the generator, resiliently yieldable means normally to urge said circuit closing device into circuit breaking position to relieve said engine of the generator load, means actuated in response to the vacuum at the intake of said engine to overcome said resiliently yieldable means and to hold said circuit closing device in circuit closing position so as to render said generator operative, and adjustable means to predetermine the ratio of force between said resiliently yieldable means and said vacuum to open said circuit closing device whenever said vacuum decreases to a degree predetermined by said adjustable means.

2. The device defined in claim 1, and an auxiliary switch connected in the generator circuit parallel with said circuit closing device, means responsive to the battery circuit of said vehicle to hold said auxiliary switch open, and means to close said auxiliary switch whenever the current of said battery circuit decreases below a predetermined strength so as to close said generator circuit for charging said battery.

3. In a device for controlling the generator load on the engine of a vehicle, a circuit closing device for connecting and disconnecting the field circuit of the generator, resiliently yieldable means for causing said circuit closing device to disconnect said field circuit and means responsive to the propelling load on the engine normally for overcoming said resiliently yieldable means and connecting said field circuit and to permit said resiliently yieldable means to disconnect said field circuit beyond a predetermined increase of the propelling load on said engine, thereby to relieve said engine from the generator load during said increased propelling load.

4. The device defined in claim 3 and an auxiliary circuit closing device for connecting said field circuit independently of said first mentioned circuit closing device, and means responsive to the electric charge of a battery of said vehicle charged by said generator to hold said auxiliary circuit closing device in circuit opening position by a predetermined strength of current of said battery and permit the closing of said auxiliary circuit closing device when said battery current strength falls below said predetermined strength.

5. In a device for controlling the generator load on the engine of a vehicle, a circuit closing device connected in series in the field circuit of the generator, a spring pressed diaphragm to hold said circuit closing device in circuit opening position so as to completely relieve said generator load, a vacuum device on one side of the diaphragm to shift said diaphragm into circuit closing position by a predetermined suction of vacuum created by said engine during normal engine load, and to release said diaphragm to circuit opening position when said suction is decreased by lowering of vacuum created by said engine during increased engine load.

6. The device described in claim 5, said generator charging a battery in said vehicle, an auxiliary circuit closing device connected in series with the field circuit of said generator and in parallel with said first mentioned circuit closing device, electro-magnetic means connected to said battery to hold said auxiliary circuit closing device in circuit opening postion as long as the battery current is above a predetermined voltage and to cause said auxiliary circuit breaker to close said generator field circuit when battery current is below said predetermined voltage.

7. In a device for controlling the generator load on the engine of a vehicle, a circuit closing device connected in series in the electric circuit of the generator, resilient means to urge said circuit closing device to close said circuit, a diaphragm adjacent said circuit closing device, coacting elements on said diaphragm and on said circuit closing device for opening said circuit closing device in an opening position of the diaphragm and to cause the closing of said circuit closing device in closing position of said diaphragm, an adjustable spring to urge said diaphragm to said opening position, means to subject said diaphragm to suction created by the vacuum in the engine manifold so as to move said diaphragm into said closing position when said suction is of sufficient strength to hold said diaphragm in said closing position against said spring and to permit said diaphragm to be moved by said spring into said open position when the strength of said suction is below said sufficient strength.

8. A device as defined in claim 7, said generator charging a battery in said vehicle, an auxiliary switch connected in series in the electric circuit of said generator and in parallel with said circuit closing device, and means responsive to the voltage of said battery to hold said auxialiary switch open as long as the battery current is above a predetermined voltage and to cause the closing of said switch when the battery current is below said predetermined voltage.

References Cited in the file of this patent

UNITED STATES PATENTS

| | | |
|---|---|---|
| 1,205,010 | Pearson | Nov. 14, 1916 |
| 1,954,563 | De Malaussene | Apr. 10, 1934 |